Patented Feb. 20, 1945

2,369,646

UNITED STATES PATENT OFFICE 2,369,646

THIOKETONES

Leslie G. S. Brooker and Grafton H. Keyes, Rochester, N. Y., assignors to Eastman Kodak Company, Rochester, N. Y., a corporation of New Jersey No Drawing. Application September 13, 1940, Serial No. 356,657
In Great Britain December 15, 1939

22 Claims. (Cl. 260—304)

This invention relates to thioketones and to a process for preparing them.

In the copending application, Serial No. 330,580, filed April 14, 1940 (now United States Patent 2,231,659, dated February 11, 1941), of Leslie G. S. Brooker and Frank L. White, halogenovinyl derivatives of the following general formula are described:

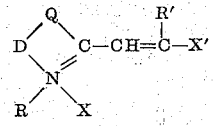

wherein D represents a phenylene or a naphthylene group, Q represents a sulfur or a selenium atom, R represents an alkyl group, R' represents an aryl group, X represents an acid radical and X' represents halogen.

We have now found that halogenovinyl derivatives of the above type and related types can be converted into thioketones, by treatment with metal or ammonium sulfides or with metal or ammonium thiosulfates. The conversion can be illustrated for the benzothiazole series as follows:

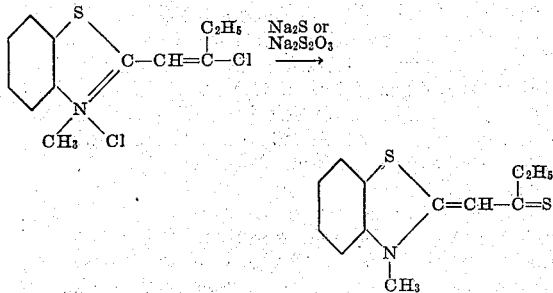

The thioketones thus obtained sensitize photographic silver halide emulsions, we have found. Moreover, we have found that the thioketones can be converted into useful dye intermediates by treatment with alkyl salts.

It is, accordingly, an object of our invention to provide new thioketones. A further object is to provide a process for preparing such thioketones. A further object is to provide new dye intermediates and a process for preparing them. Other objects will become apparent hereinafter.

In accordance with our invention, we treat, with a metal or ammonium sulfide or with a metal or ammonium thiosulfate, a compound of the following general formula:

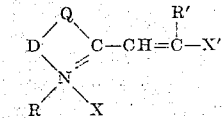

wherein D represents a phenylene or a naphthylene group, Q represents a sulfur or selenium atom, R and R' represent alkyl or aryl groups, X represents an acid radical and X' represents halogen. The compounds wherein X represents a halide ion are advantageously employed.

As metal sulfides, alkali metal and alkaline earth metal sulfides are advantageously employed. As metal thiosulfates, alkali metal and alkaline earth metal thiosulfates are advantageously employed. The treatment with the sulfide or thiosulfate is advantageously carried out in the presence of a diluent, such as a lower aliphatic alcohol, like methyl, ethyl or isopropyl alcohol. Heat accelerates the reaction of the sulfide or thiosulfate with the halogenovinyl compounds.

The following examples will serve to illustrate the maner of practicing our invention. These examples are not intended to limit our invention.

*Example 1.—3-ethyl-2 - thiofuroylmethylenebenzothiazoline*

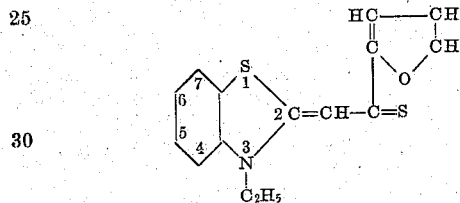

27.1 g. (1 mol.) of 3-ethyl-2-furoylmethylenebenzothiazoline were suspended in 100 cc. of dry benzene. To this suspension were added 22.9 g. (1.5 mol.) of phosphorous oxychloride, with stirring. The resulting mixture was stirred for ten further minutes at 20° to 25° C. The mixture was then diluted with 100 cc. of diethyl ether and the whole was chilled to 0° C., while stirring. A solid separated out. The liquids were decanted, and the solid chlorovinyl compound was dissolved in 50 cc. of ethyl alcohol. To this solution was added a solution of 24.8 g. (1 mol.) of sodium thiosulfate ($Na_2S_2O_3 \cdot 5H_2O$) dissolved in 25 cc. of water. The resulting mixture was heated for ten minutes on a steam bath. Upon chilling the reaction mixture, the thioketone separated out. It was filtered off, washed with water (100 cc.), methyl alcohol (50 cc.) and finally dried in the air. 16.2 g. (56% yield) were obtained. After two recrystallizations from methyl alcohol (178 cc. per gram of ketone), it was obtained as brownish crystals, melting at 163° to 165° C. with decomposition.

Example 2.—3-ethyl-2-thiobenzoylmethylenebenzothiazoline

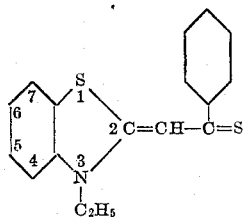

56.2 g. (1 mol.) of 2-benzoylmethylene-3-ethylbenzothiazoline were suspended in 200 cc. of dried benzene. To the resulting suspension, 45.9 g. (1.5 mol.) of phosphorous oxychloride were added, with stirring. The resulting mixture was chilled to 0° C., whereupon the chlorovinyl compound separated out. The chlorovinyl compound was filtered off and washed well with acetone (300 cc.). It was then dissolved in 100 cc. of 95% ethyl alcohol. The solution was heated to boiling, under reflux, and a solution of 49.6 g. (1 mol.) of sodium thiosulfate ($Na_2S_2O_3 \cdot 5H_2O$) in 50 cc. of water was added slowly. A vigorous reaction took place, with the evolution of heat. The reaction mixture was chilled, and the thioketone which separated was filtered off. It was washed well with water (500 cc.) and finally dried in the air. In this manner, 24.9 g. (65% yield) of thioketone were obtained. After recrystallization from methyl alcohol (410 cc. per gram of thioketone), the thioketone was obtained as scarlet needles, melting at 194° to 196° C.

Example 3.—1-methyl-2-thiopropionyl-methylene-β-naphthothiazoline

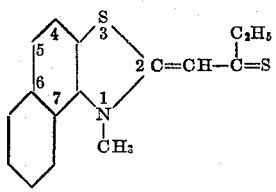

62.4 g. (2 mol.) of sodium sulfide were dissolved in 100 cc. of boiling water, and the resulting solution filtered while hot. The filtered solution was cooled and added to 400 cc. of methyl alcohol. The resulting solution was chilled to 0° C. To the chilled mixture, 130 g. (1 mol.) of 2-(2-chlorobutenyl) - β - naphthothiazole methochloride were added, with stirring. The resulting mixture was allowed to stand in an ice-box for about 12 hours. The thioketone which separated was filtered off and washed well with water. It was further purified by dissolving in 500 cc. of boiling methyl alcohol. After chilling the methyl alcohol solution, the thioketone was filtered off (72% yield) and dried in the air. It was obtained as orange-yellow needles, melting at 203° to 206° C. with decomposition.

Example 4.—1-ethyl-2-thiobenzoylmethylene-β-naphthothiazoline 33.1 g. (1 mol.) of 1-ethyl-2-benzoylmethylene-β-naphthothiazoline were suspended in 100 cc. of dry benzene. To this suspension, 22.8 g. (1.5 mol.) of phosphorous oxychloride were added. The resulting mixture was heated on a steam bath, so that the benzene was brought to the boiling point. The mixture was then chilled. 50 cc. of diethyl ether were added to the chilled mixture, and the chlorovinyl compound which separated was filtered off and washed with acetone.

The chlorovinyl compound thus prepared was dissolved in 100 cc. of ethyl alcohol by heating the alcohol to boiling. To this solution was added a solution of 24.8 g. (1 mol.) of sodium thiosulfate ($Na_2S_2O_3 \cdot 5H_2O$) in 20 cc. of water. A vigorous reaction ensued, and the solid thioketone separated out. The reaction mixture was chilled and the thioketone filtered off. It was washed with water (200 cc.) and then stirred with 100 cc. of methyl alcohol. It was filtered from the methyl alcohol and dried in the air (yield 93%). It was twice recrystallized from methyl alcohol (900 cc. per gram of thioketone) and obtained as amber crystals, melting at 205° to 207° C. with decomposition.

Example 5.—3 - ethyl-2-thioacetylmethylenebenzothiazoline 5.5 g. (1 mol.) of 2-(2-chloropropenyl)-benzothiazole ethochloride were added, with stirring, to a solution of 3.2 g. (2 mol.) of sodium sulfide in a mixture of water (20 cc.) and ethyl alcohol (70 cc.). Stirring was continued for 30 minutes, during which time the thioketone separated as a solid product. The reaction mixture was allowed to stand at 0° C. for about 12 hours. The thioketone was then filtered off, washed with water (20 cc.), washed with methyl alcohol (10 cc.) and finally dried in the air. After recrystallization from methyl alcohol, the thioketone was obtained as brownish yellow crystals, melting at 142° to 144° C. with decomposition.

Example 6.—5-chloro-3-ethyl-2-thiopropionyl-methylenebenzothiazoline

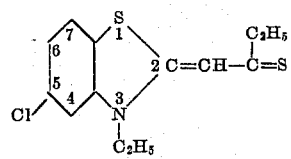

126 g. (1 mol.) of 5-chloro-3-ethyl-2-propionylmethylene benzothiazoline were suspended in 300 cc. of dry benzene. To this suspension, chilled, were added 109 g. (1.5 mol.) of phosphorous oxychloride, with stirring. The chilled reaction product was diluted with 300 cc. of diethyl ether whereupon the chlorovinyl compound separated.

The liquids were decanted from the chlorovinyl compound and it was dissolved in 500 cc. of methyl alcohol. 75 g. (2 mol.) of sodium sulfide dissolved in 100 cc. of hot water were added to the methyl alcoholic solution, with stirring. Stirring was continued for 10 minutes. The reaction mixture was then allowed to stand in the ice-box for about twelve hours. The thioketone was then filtered off, washed with water (300 cc.) and with methyl alcohol (100 cc.). It was further purified by boiling with 200 cc. of methyl alcohol solution, the thioketone was filtered off and dried in the air (yield 33%). A portion was twice recrystallized from methyl alcohol (77 cc. per gram of thioketone) and obtained as yellow crystals, melting at 156° to 157° C. with decomposition.

In a similar manner, 5-chloro-3-methyl-2-thiopropionylmethylenebenzoselenazoline, melting at 194° to 196° C., can be prepared.

In a manner similar to that illustrated in the above examples, 2-(2-chlorobutenyl)-benzothiazole phenochloride (see our copending application Serial No. 356,656, filed of even date herewith) can be converted into 3-phenyl-2-thiopropionylmethylenebenzothiazoline, and 2-(2-chloropropenyl) - 3,4 - trimethylenebenzothiazolium chloride (see our copending application Serial No. 356,656, filed of even date herewith) can be converted into 2-thioacetylmethylene-3,4-trimethylenebenzothiazoline.

From our new thioketones, valuable dye intermediates can be prepared by treating the thioketones with alkyl salts. The reaction for the benzothiazole series can be illustrated as follows:

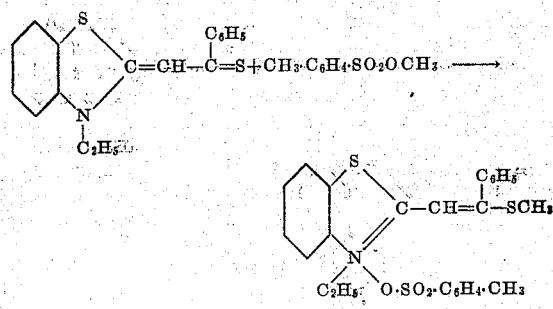

The following examples illustrate the formation of dye intermediates by our new process, and the formation of dyes from such intermediates. These examples are not intended to limit our invention:

*Example 7.—2-(2-methylmercaptostyryl)-benzothiazole ethiodide*

3 g. (1 mol.) of 3-ethyl-2-thiobenzoylmethylenebenzothiazoline and 1.9 g. (1 mol.) of methyl-p-toluenesulfonate were heated together on a steam bath for one hour. The viscous reaction product was cooled and dissolved in methyl alcohol (20 cc.) and an excess of potassium iodide in aqueous solution was added. The ethiodide which precipitated was filtered off, washed with water (25 cc.), with acetone (25 cc.), and finally dried in the air (yield 41%). After two recrystallizations from methyl alcohol (40 cc. per gram of ethiodide), the ethiodide was obtained as yellow crystals, melting at 215° to 217° C. with decomposition.

*Example 8.—2-(2-methylmercapto-1-butenyl)-β-naphthothiazole metho-p-toluenesulfonate*

12 g. (1 mol.) of 1-methyl-2-thiopropionylmethylene-β-naphthothiazoline and 7.6 g. (1 mol.) of methyl-p-toluenesulfonate were heated together on a steam bath for one hour. The solid reaction product was cooled and crushed under acetone. It was filtered from the acetone and dried in the air. It can be employed without further purification.

*Example 9.—2 - (2 - methylmercaptostyryl) - β - naphthothiazole ethiodide*

3.4 g. (1 mol.) of 1-ethyl-2-thiobenzoylmethylene-β-naphthothiazoline and 1.9 g. (1 mol.) of methyl-p-toluenesulfonate were heated together on a steam bath for one hour. The solid reaction product was cooled and dissolved in 30 cc. of ethyl alcohol. To this solution were added an excess of potassium iodide dissolved in water. The mixture was chilled and the crystalline ethiodide which separated was filtered, washed with water (50 cc.), acetone (100 cc.), and finally dried in the air. After two recrystallizations from methyl alcohol, it was obtained as brownish yellow crystals, melting at 185° to 187° C. with decomposition.

*Example 10.—5-chloro-2-(2-methylmercaptopropenyl)-benzothiazole ethiodide*

2.7 g. (1 mol.) of 5-chloro-3-ethyl-2-thioacetylmethylene benzothiazoline and 1.9 g. (1 mol.) of methyl-p-toluenesulfonate were heated together on a steam bath for one hour. The resulting viscous mass was cooled and dissolved in 25 cc. of methyl alcohol. To this solution was added 3 g. of potassium iodide dissolved in 15 cc. of boiling water. The mixture was boiled for a few minutes. It was then chilled, and the ethiodide which separated was filtered off, washed with water (50 cc.), acetone (50 cc.), and finally dried in the air (yield 66%). After two recrystallizations from methyl alcohol, it was obtained as brownish crystals, melting at 227° to 229° C. with decomposition.

In a manner similar to that illustrated in the above Examples 7 to 10, 3-ethyl-2-thiofuroylmethylenebenzothiazoline and 3-ethyl-2-thioacetylmethylenebenzothiazoline can be converted into dye intermediates.

The above dye intermediates can be condensed, in the presence of a basic condensing agent, such as triethylamine, with cyclammonium quaternary salts containing a methyl group in the alpha or gamma position, such as 2-methylbenzothiazole ethiodide, 2-methylbenzothiazole pheniodide, 2-methylbenzoxazole ethiodide, 2-methylbenzoselenazole ethiodide and lepidine ethiodide, to give carbocyanine dyes which sensitize photographic silver halide emulsions, such as gelatino-silver-bromoiodide emulsions. In connection with sensitization of photographic emulsions, it should be noted, however, that carbocyanine dyes derived from the dye intermediate from 3-ethyl-2-thiofuroylmethylenebenzothiazoline, appear to show no sensitizing action.

What we claim as our invention and desire to be secured by Letters Patent of the United States is:

1. A thioketone of the following formula:

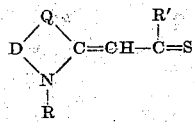

wherein D represents an organic radical selected from the group consisting of phenylene and naphthylene groups, Q represents an atom selected from the group consisting of sulfur and selenium atoms, R represents an alkyl group and R' represents an aryl group.

2. A thioketone of the following formula:

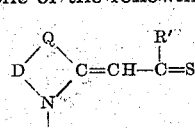

wherein D represents a phenylene group, Q represents an atom selected from the group consisting of sulfur and selenium atoms, R represents an alkyl group and R' represents an aryl group.

3. A thioketone of the following formula:

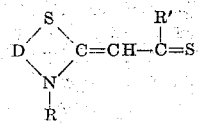

wherein D represents a phenylene group, R represents an alkyl group and R' represents a phenyl group.

4. A thioketone of the following formula:

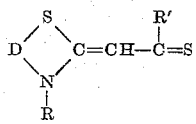

wherein D represents a naphthylene group, R represents an alkyl group and R' represents a phenyl group.

5. 3-ethyl-2-thiobenzoylmethylenebenzothiazoline.
6. 1-ethyl-2-thiobenzoylmethylene-β-naphthothiazoline.
7. 3 - ethyl-2-thiofuroylmethylenebenzothiazoline.
8. A process for preparing a thioketone comprising treating, with a substance selected from the group consisting of metal sulfides, ammonium sulfides, metal thiosulfates and ammonium thiosulfates, a compound of the following formula:

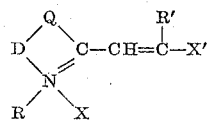

wherein D represents an organic radical selected from the group consisting of phenylene and naphthylene groups, Q represents an atom selected from the group consisting of sulfur and selenium atoms, R and R' represent organic radicals selected from the group consisting of alkyl and aryl groups, X represents an acid radical and X' represents halogen.

9. A process for preparing a thioketone comprising treating, with a substance selected from the group consisting of metal sulfides, ammonium sulfides, metal thiosulfates and ammonium thiosulfates, a compound of the following formula:

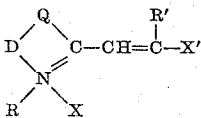

wherein D represents an organic radical selected from the group consisting of phenylene and naphthylene groups, Q represents an atom selected from the group consisting of sulfur and selenium atoms, R and R' represent organic radicals selected from the group consisting of alkyl and aryl groups, X represents a halide ion, and X' represents halogen.

10. A process for preparing a thioketone comprising treating, with an alkali metal sulfide, a compound of the following formula:

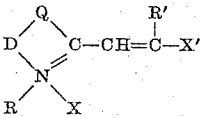

wherein D represents an organic radical selected from the group consisting of phenylene and naphthylene groups, Q represents an atom selected from the group consisting of sulfur and selenium atoms, R and R' represent organic radicals selected from the group consisting of alkyl and aryl groups, X represents a halide ion, and X' represents halogen.

11. A process for preparing a thioketone comprising treating, with an alkali metal thiosulfate, a compound of the following formula:

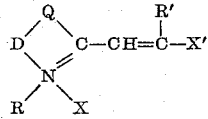

wherein D represents an organic radical selected from the group consisting of phenylene and naphthylene groups, Q represents an atom selected from the group consisting of sulfur and selenium atoms, R and R' represent organic radicals selected from the group consisting of alkyl and aryl groups, X represents a halide ion, and X' represents halogen.

12. A process for preparing a thioketone comprising treating, with an alkali metal sulfide, a compound of the following formula:

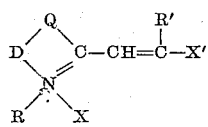

wherein D represents a phenylene group, Q represents an atoms selected from the group consisting of sulfur and selenium atoms, R represents an alkyl group, R' represents an organic radical selected from the group consisting of alkyl and aryl groups, X represents a halide ion, and X' represents halogen.

13. A process for preparing a thioketone comprising treating, with an alkali metal thiosulfate, a compound of the following formula:

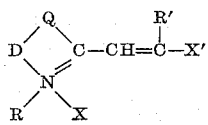

wherein D represents a phenylene group, Q represents an atom selected from the group consisting of sulfur and selenium atoms, R represents an alkyl group, R' represents an organic radical selected from the group consisting of alkyl and aryl groups, X represents a halide ion, and X' represents halogen.

14. A process for preparing a thioketone comprising treating, with an alkali metal sulfide, a compound of the following formula:

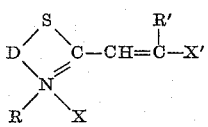

wherein D represents a naphthylene group, R represents an alkyl group, R' represents an organic radical selected from the group consisting of alkyl and aryl groups, X represents a halide ion and X' represents halogen.

15. A process for preparing a thioketone comprising treating, with an alkali metal thiosulfate, a compound of the following formula:

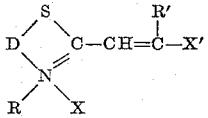

wherein D represents a naphthylene group, R represents an alkyl group, R' represents an organic radical selected from the group consisting of alkyl and aryl groups, X represents a halide ion and X' represents halogen.

16. A process for preparing a thioketone comprising treating, with an alkali metal sulfide, a compound of the following formula:

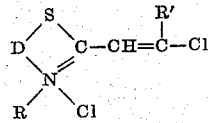

wherein D represents a phenylene group, R represents an alkyl group, and R' represents an organic radical selected from the group consisting of alkyl and aryl groups.

17. A process for preparing a thioketone comprising treating, with an alkali metal thiosulfate, a compound of the following formula:

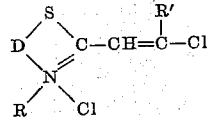

wherein D represents a phenylene group, R represents an alkyl group, and R' represents an organic radical selected from the group consisting of alkyl and aryl groups.

18. A process for preparing a thioketone comprising treating, with an alkali metal sulfide, a compound of the following formula:

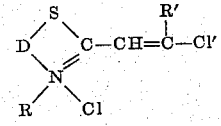

wherein D represents a naphthylene group, R represents an alkyl group, and R' represents an organic radical selected from the group consisting of alkyl and aryl groups.

19. A process for preparing a thioketone comprising treating, with an alkali metal thiosulfate, a compound of the following formula:

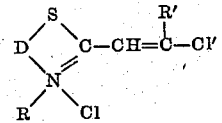

wherein D represents a naphthylene group, R represents an alkyl group, and R' represents an organic radical selected from the group consisting of alkyl and aryl groups.

20. Process of preparing azole compounds of the formula:

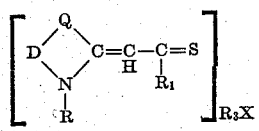

in which D is a radical completing the azole ring, Q is an atom of the group consisting of sulphur and selenium, R is an alkyl radical, and the $R_1$ radical is taken from the group consisting of alkyl and aryl radicals, and the group $R_3X$ is a radical of the group consisting of alkyl and aralkyl salts, by reacting a compound of the corresponding formula:

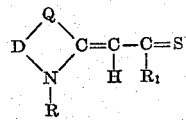

with a compound of the group consisting of alkyl and aralkyl salts.

21. Process as defined in claim 20 in which D is a radical of the group consisting of phenylene and naphthalene radicals.

22. Process as defined in claim 20 and in which D is a radical of the group consisting of phenylene and naphthalene radicals and Q is sulphur.

LESLIE G. S. BROOKER.
GRAFTON H. KEYES.